(12) United States Patent
Fang et al.

(10) Patent No.: US 11,385,181 B2
(45) Date of Patent: Jul. 12, 2022

(54) EVALUATING THE EFFICACY OF LEAVE-ON COSMETIC COMPOSITIONS TO PROTECT SKIN FROM POLLUTANTS

(71) Applicant: CONOPCO, INC., Trumbull, CT (US)

(72) Inventors: Yi Fang, Shanghai (CN); Sheng Meng, Shanghai (CN); Shangchun Yi, Shanghai (CN)

(73) Assignee: CONOPCO, INC., Englewood Cliffs, NJ (US)

( * ) Notice: Subject to any disclaimer, the term of this patent is extended or adjusted under 35 U.S.C. 154(b) by 1 day.

(21) Appl. No.: 17/269,598

(22) PCT Filed: Sep. 2, 2019

(86) PCT No.: PCT/EP2019/073351
§ 371 (c)(1),
(2) Date: Feb. 19, 2021

(87) PCT Pub. No.: WO2020/053019
PCT Pub. Date: Mar. 19, 2020

(65) Prior Publication Data
US 2021/0318246 A1    Oct. 14, 2021

(30) Foreign Application Priority Data

Sep. 14, 2018  (WO) ................ PCT/CN2018/105732
Oct. 22, 2018  (EP) ..................................... 18201764

(51) Int. Cl.
*G01N 21/64*   (2006.01)
*G01N 13/00*   (2006.01)

(52) U.S. Cl.
CPC ......... *G01N 21/6458* (2013.01); *G01N 13/00* (2013.01); *G01N 21/6408* (2013.01); *G01N 2013/003* (2013.01)

(58) Field of Classification Search
CPC ............... G01N 21/6458; G01N 13/00; G01N 21/6408; G01N 2013/003
See application file for complete search history.

(56) References Cited

U.S. PATENT DOCUMENTS 8,021,848 B2    9/2011  Straus
2004/0047823 A1  3/2004  Catroux et al.
(Continued)

FOREIGN PATENT DOCUMENTS

DE    3233258    3/1984
DE    4340827    5/1995
(Continued)

OTHER PUBLICATIONS

Search Report and Written Opinion in EP18182710; dated Jan. 25, 2019; European Patent Office (EPO).
(Continued)

*Primary Examiner* — David P Porta
*Assistant Examiner* — Djura Malevic
(74) *Attorney, Agent, or Firm* — Stephanie Huang

(57) ABSTRACT

Disclosed is a method of determining efficacy of a cosmetic composition to inhibit an atmospheric pollutant from contacting skin, comprising the steps of: (i) filling a sample holder of known dimensions with known amount of said composition to form a layer of defined thickness therein, where said sample holder is amenable to fluorescence-based assay; (ii) depositing, on said layer, a known amount of a model fine particulate matter which resembles an atmospheric pollutant at least in size and which comprises a material responsive to fluorescence microscopy which is excitable by a wavelength ($\lambda_{ex}$) and which emits radiation ($\lambda_{em}$) where ($\lambda_{ex}$)≠($\lambda_{em}$); (iii) irradiating said composition and said model fine particulate matter by said $\lambda_{ex}$ and recording intensity of fluorescence at $\lambda_{em}$ a plurality of times
(Continued)

for a defined period during which said model fine particulate matter interacts with said layer; and, (iv) determining, corrected intensity of fluorescence at $\lambda_{em}$ by the following equation; corrected Intensity=recorded intensity/average transmittance where said average transmittance is the average of the transmittance of the composition measured at $\lambda_{ex}$ and $\lambda_{em}$ determined by Beer-Lambert law by measuring the absorbance at $\lambda_{ex}$ and $\lambda_{em}$, where the corrected intensity is inversely proportional to said efficacy of said composition.

15 Claims, 3 Drawing Sheets

(56) References Cited

U.S. PATENT DOCUMENTS

| | | | |
|---|---|---|---|
| 2006/0057558 | A1 | 3/2006 | Scott |
| 2010/0247443 | A1 | 9/2010 | Iwaki et al. |
| 2011/0027914 | A1 | 2/2011 | Bunce et al. |
| 2011/0178411 | A1* | 7/2011 | Roth ............... A61B 5/0036 424/9.2 |
| 2011/0269239 | A1 | 11/2011 | Diessel et al. |
| 2014/0162291 | A1 | 6/2014 | Osman-Ponchet |
| 2015/0177221 | A1 | 6/2015 | Peterson |
| 2015/0362412 | A1 | 12/2015 | Yagi et al. |
| 2016/0045114 | A1 | 2/2016 | Dacosta et al. |
| 2016/0245795 | A1 | 8/2016 | Baudouin et al. |
| 2017/0045530 | A1 | 2/2017 | Warner et al. |
| 2018/0104174 | A1 | 4/2018 | Courtin et al. |
| 2019/0234939 | A1 | 8/2019 | Baudouin et al. |
| 2019/0242880 | A1 | 8/2019 | Bredif et al. |
| 2021/0364771 | A1* | 11/2021 | Wetzstein ............ G02B 21/006 |

FOREIGN PATENT DOCUMENTS

| | | |
|---|---|---|
| DE | 202010004968 | 9/2010 |
| JP | 2011047726 | 3/2011 |
| JP | 2017184659 | 10/2017 |
| WO | WO9402847 | 2/1994 |
| WO | WO9721097 | 6/1997 |
| WO | WO2015094490 | 6/2015 |

OTHER PUBLICATIONS

Lademann et al.; Comparison of two in vitro models for the analysis of follicular penetration and its prevention by barrier emulsions; European Journal of Pharmaceutics and Biopharmaceutics; Feb. 11, 2009; pp. 600-604; XP026218299; vol. 72, No. 3; Elsevier.
Puchalski et al.; Assessment of inner filter effect corrections in fluorimetry; Fresenius' Journal of Analytical Chemistry; Feb. 6, 1991; pp. 341-344; XP055550705; vol. 340, No. 6; Springer-Verlag.
Rieger et al.; Application of in-vivo laser scanning microscopy for evaluation of barrier creams; Laser Physics Letters; Jan. 1, 2007; pp. 72-76; XP055541415; vol. 4, No. 1; Wiley-VCH Verlag GmbH & Co. KGaA.
Search Report and Written Opinion in EP18201764; dated Feb. 11, 2019; European Patent Office (EPO).
Search Report and Written Opinion in PCTEP2019061200; dated Jul. 18, 2019; European Patent Office (EPO).
Benoit Cushman-Roisin; Chapter 2—Diffusion Equation Part 1 Environmental Transport and Fate; Internet Article Diffusion Equation; Jan. 9, 2012; pp. 4-8, XP055603699.
Search Report and Written Opinion in PCTEP2019073351; dated Sep. 30, 2019; World Intellectual Property Org. (WIPO).
Zhai et al.; Effect of barrier creams: human skin in vivo; Contact Dermatitis; 1996; pp. 92-96; vol. 35; Munksgaard; Denmark.
Marks et al.; Two novel techniques for the evaluation of barrier creams; British Journal of Dermatology; 1989; pp. 655-660; vol. 120.
Olivarius et al.; Water protective effect of barrier creams and moisturizing creams: a new in vivo test method; Contact Dermatitis; 1996; pp. 219-225; vol. 35; Munksgaard; Denmark.
Eeman et al. ; Innovative Silicone-based Solutions to Protect Skin against Pollution; Dow Corning Splash Shield; 2016; pp. 1-28; Corning, Inc.
Garaud et al.; A Nature-Inspired Approach to Particule Pollution Protection; Dow Corning; 2015; pp. 1-8; Dow Corning Corporation; United States of America.
Armand-Stussi et al.; Moringa oleifera, An interesting source of active ingredients for skin; BASF Purisoft; 2003; pp. 1-29; BASF The Chemical Company; France.
AIMTEC; Ward Off Pollutants from the Skin; Lipotec Pollushield; 2015/2016; pp. 1-25; V 1; The Lubrizol Corporation.
IPRP2 in PCTEP2019061200; dated Jul. 27, 2020; World Intellectual Property Org. (WIPO).
Written Opinion 2 in PCTEP2019061200; dated Apr. 23, 2020; World Intellectual Property Org. (WIPO).
Morvan et al.; Development of an Original and Natural Antipollution Ingredients; IFSCC; 2016; pp. 1-6.
Nizard et al.; Pollution skin protection by cosmetic formula against placebo: ex-vivo model with 32 pollutants; H&PC Today; Jan.-Feb. 2015; pp. 26-28; vol. 10 No. 1.
Biefeldt et al.; Pollution Protection and the Skin—Testing Strategies; H&PC Today Sep.-Oct. 2016; pp. 18-20; vol. 11 No. 5.
Comas et al.; A Cosmetic Armor Against Pollution; HAPPI; 2016; pp. 1-11.
Syntivia; How to measure anti-pollution claims in vitro; in—cosmetics global; Apr. 2017; pp. 1-5.
Juliano et al.; Cosmetic Functional Ingredients from jBotanical Sources for Anti-Pollution Skincare Products; Cosmetics; Feb. 6, 2018; pp. 1-18; vol. 5 No. 19; MDPI.
Li et al.; Skin toxicity determined in vitro by three-dimensional, native-stated histoculture; Proc. Natl. Acad. Sci. USA Medical Sciences; Mar. 1991; pp. 1908-1912; vol. 88.
Mussi et al.; Proven Efficacy In Reducing Pollutant Permeation; HP&C Today; Jan.-Feb. 2017; pp. 1-3; vol. 12 No. 1; Chemyunion.
Nancy E. Kincade, PhD; Measuring Reactive Oxygen Species in Skin with Fluorescence Microscopy; Cosmetics and Toiletries magazine; May 2007; pp. 99-106; vol. 122 No. 5.
Kurpiewska et al.; Skin protection agents protecting against organic substances; Podstawy i Metody Oceny Srodowiska Pracy; 2013; pp. 171-184; vol. 2 No. 76; Poland.
Qu et al.; Pollution Protection Models For Assessing Efficacy Of Hair Care; 63rd Sepawa Congress And European Detergents Conference; 2016; Abstract Only; Germany.
Mollet et al.; EGFP Fluorescent Recombinant Protein, And Cell Penetrating Peptide Tagged EGFP For The Evaluation Of Cosmetic Ingredients Efficacy; Innovation & Responsibility: Cosmetics Forever; 2010; Abstract Only; 26th IFSCC Congress Buenos Aires.

* cited by examiner

EVALUATING THE EFFICACY OF LEAVE-ON COSMETIC COMPOSITIONS TO PROTECT SKIN FROM POLLUTANTS

CROSS REFERENCE TO RELATED APPLICATIONS

The present application is a U.S. National Phase Application under 35 U.S.C. § 371 of International Application No. PCT/EP2019/073351, filed on Sep. 2, 2019, which claims priority to International Application No. PCT/CN2018/105732, filed on Sep. 14, 2018, and European Patent Application No. 18201764.0, filed on Oct. 22, 2018, the contents of which are incorporated herein in their entireties.

FIELD OF THE INVENTION

The present invention relates to a method of evaluating efficacy of cosmetic compositions. More particularly, the invention relates to a method of evaluating efficacy of leave-on cosmetic compositions to prevent or inhibit particulate pollutants from contacting skin.

BACKGROUND OF THE INVENTION

The World Health Organization (WHO) reports that outdoor air pollution originates from natural and anthropogenic sources. While natural sources contribute substantially to air pollution in arid regions more prone to forest fires and dust storms, the contribution from human activities far exceeds that from natural sources.

Such human activities include fuel combustion, heat and power generation and industrial facilities (e.g. manufacturing factories, mines, and oil refineries). WHO classifies pollutants into particulate matter, black carbon, ground-level ozone and oxides of carbon, nitrogen and sulphur.

Particulate matter (PM) are inhalable particles composed of sulphates, nitrates, ammonia, sodium chloride, carbon, mineral dust and water. Particles with a diameter less than 10 microns ($PM_{10}$), including fine particles less than 2.5 microns ($PM_{2.5}$) pose the greatest risk. Carbon black (soot) and dust (mineral oxides, such as iron oxides and the like) comprise much of the particulate matter in these size ranges.

WHO defines air pollution as contamination of indoor or outdoor environments by any chemical, physical, or biological agent that modifies the natural characteristics of the atmosphere. The U.S. Environmental Protection Agency (EPA) and the WHO have summarized the global extent of common atmospheric pollutants. In addition, there are innumerable reports and scientific publications pertaining to adverse effects of pollution on human skin. These adverse effects include premature ageing, development of fine lines and wrinkles, pigmented spots, hyperpigmentation, rash and inflammation.

Some cosmetic compositions claim to prevent, inhibit or restrict the particulate pollutants from contacting human skin by forming a protective layer, i.e., they partly or fully block environmental pollutants like particles, oxide/superoxides and gases from contacting human skin. Formulation scientists often find it necessary to be able to substantiate such claims with evidence. Therefore, several manufacturers and researchers have published their own methods of testing/analysing or verifying the efficacy of a given compositions. A purpose of such methods is to ascertain the efficacy of a candidate cosmetic composition. At times the purpose also could be to compare the efficacy of one or more compositions or active ingredients, e.g. polymers. Some of these tests are conducted on human volunteers. Some others have been conducted on suitable skin-equivalents such as plastic membranes, living-skin equivalents, Vitro-Skin®, in vitro skin models, ex vivo skin and the like. While human skin-equivalents is one components of such test methods, selection of an appropriate pollutant is equally important. However, it is not always possible to perform tests with real pollutants therefore model pollutants are often used.

DE4340827 C1 (Aerochemica, 1995) discloses a method and device for in-vitro determination of efficacy against chemical substances and substance mixtures. The barrier effect of a cosmetic is determined in a well-defined amount and thickness on a predetermined surface of a skin simulating membrane, like cellulose nitrate, nylon or PTFE. The concerned composition is applied to this membrane. Subsequently, the membrane is sandwiched on a specific dry indicator paper laid and stretched while maintaining flat contact with the membrane. Then, a measured drop of the defined pollutant is applied over the layer of the cosmetic. Depending on the effectiveness of the preparation, the pollutant may permeate rapidly and trigger a color change in the indicator paper. This change is monitored by irradiating white light via fibers onto the indicator paper by means of a statistically split optical fiber bundle. The remaining, about 50% receiver fibers absorb the scattered light and lead it to a detector. Here there is signal filtering and amplification followed by recording. For example, a photodiode receives the light from the fiber optic cable, an amplifier amplified linearly or logarithmically (depending on the color change of the indicator paper) and gives the signal through the output to a recorder.

The method disclosed in DE4340827 C1 relies on the use of color-changing indicators therefore using this method it is possible to find out when the colour changes which tells the point in time at which the membrane is no longer able to provide barrier effect.

Zhai et al have disclosed an in-vivo method in Contact Dermatitis, 1996, 35, 92-96, to measure the effectiveness of skin protective creams against two dye indicator solutions: methylene blue in water and oil red in ethanol, representative of model hydrophilic and lipophilic compounds. Three commercial compositions were assayed by measuring the dye in cyanoacrylate strips of protected skin samples after various application times. The flexural surfaces of the forearms of 6 normal volunteers (3 female and 3 male, mean age 26.8 years) were treated.

Lademann et al have disclosed comparison of two in vitro models for the analysis of follicular penetration and its prevention by barrier emulsions in European Journal of Pharmaceutics and Biopharmaceutics, 72 (2009) 600-604. In this study the efficacy of barrier emulsions in the prevention of the penetration of pollen allergens into the hair follicles was investigated. Because of the sensitising potential of the used pollen allergens, the study was carried out under in vitro conditions.

WO 97/21097 (RECH LVMH, 1997) discloses the use of a polymeric material consisting of a cross-linked acrylic or methacrylic polymer produced by polymerising a monofunctional acrylic or methacrylic monomer having a molecular weight of 50-900 and a polyfunctional acrylic or methacrylic monomer having at least two polymerisable double bonds, as an agent for simulating a skin or mucosal barrier to determine the behaviour of topical pharmaceuticals or cosmetics, is disclosed. In particular, the use of said polymers for studying the diffusion of a cosmetic or dermatological product and measuring the sun protection coefficient or occlusive properties thereof, as well as the use of said polymers as a carrier for topical cosmetic or pharmaceutical and particularly dermatological compositions, are disclosed. Cells for measuring the penetration and/or diffusion of the products to be tested, wherein the above-mentioned polymers are used as the receiving portion, are also disclosed.

Puchalski M M et al have disclosed assessment of inner filter effect corrections in fluorimetry in Fresenius J Anal Chem (1991) 340: 341-344. In this disclosure it is proposed that IFE corrections may be subject to under- or over-compensation effects that are difficult to assess accurately. Therefore, to evaluate existing IFE correction procedures, the linearity of resulting Stern-Volmer plots and the relative change of their slopes with temperature adopted as criteria.

Rieger T et al discloses applications of in-vivo laser scanning microscopy for evaluation of barrier creams in Laser Phys. Lett. 4, NO. 1, 72-76 (2007). It discloses the evaluation of penetration depth of sodium fluorescein into the skin upon crossing a barrier cream, based on fluorescence microscopy performed after removal of the barrier cream. US 2011/269239 (Bayer Technology Services GMBH, 2011) an apparatus and a method for automatically performing chemical, biochemical and biological analyses.

Solutions of 5% methylene blue in water and 5% oil red in ethanol are prepared, and applied to untreated skin and protective-cream pre-treated skin with the aid of aluminium occlusive chambers, at zero time and 4 hours, respectively. At the end of the application time, the creams are removed. Consecutive skin surface biopsies (SSB) from 1 to 4 strips were taken. The amount of stain in each strip was determined by colorimetry (Chroma Meter CR 300), and the cumulative amount of stain from 1 to 4 strips in each measurement was calculated. The cumulative amount represents the amount of permeation of each solution at each time point, and the efficacy of skin barrier cream.

A somewhat similar method of Marks et. al, is disclosed in British Journal of Dermatology (1989) 120, 655-6.

Nizard et. al have disclosed a method in H&PC Today, 10 (1) January/February 2015. In this method, a skin explant is exposed under a patch to 32 pollutants (27 heavy metals and 5 hydrocarbons) as an ex-vivo model for pollution damage. The author's formula claims to protect against pollution damage (skin morphology integrity scoring) and lipids per-oxidation (by malondialdehyde measurement). As their formula is applied on explants before the patch with pollutants, the formula creates a physical barrier. Dow Corning has disclosed a test method to quantify the extent of protection conferred by its product, Splash Shield®, against particulate adhesion. A thin film of the test material is formed on collagen followed by surface analysis and exposure to carbon black repeat analysis.

Further, Dow Corning has disclosed yet another test method in which a test material is coated on a synthetic substrate through which ozone can diffuse. At the other end is a receptacle containing solution of a dye which changes colour upon contact with ozone. Intensity of the colour is inversely proportional to the protection offered by the test material.

BASF has disclosed an ex-vivo model to determine the efficacy of its product named Purisoft® against cigarette smoke. The method relies on organotypic cultures of human skin on which the concerned products are applied followed by exposure to smoke. This is followed by biopsies and confocal microscopy to determine the extent of protection offered by the compound of interest.

Lipotec has disclosed a somewhat similar method for a similar purpose about their product Pollushield®.

In Contact Dermatitis, 1996, 35, 219-225, Olivarius et. al. have disclosed a method which relies on the colour of crystal violet which binds firmly to keratin (stratum corneum) when painted on the skin. When the skin is pretreated with a water-repellant cream, the penetration of aqueous solution of crystal violet is impaired, leading to lesser binding and paler colour. The relative efficacy of different creams is evaluated visually by comparing intensities quantified by measurement of skin reflectance. Low reflectance indicates a high binding. The protection offered by the cream is calculated as the additional colour resistance induced by the cream (x-y), divided by the maximal additional colour resistance obtainable (100-y).

Despite availability of the methods disclosed hereinabove, there is need for a robust method to determine as accurately as possible, the dynamics of penetration of a model pollutant from the atmosphere over a period to determine efficacy of cosmetic compositions that claims to prevent, or at least delay the contact of particulate atmospheric pollutants with human skin by forming, to the extent possible, a barrier between the skin and the pollutant. Such a method should permit objective analysis whilst accounting for or taking care of erroneous observations that may result due to presence of ingredients that tend to interfere in the analysis or tend to produce false positive results. Therefore, such a method is most suited for comparing the efficacies of two or more cosmetic compositions so that a reasonably accurate inference may be drawn from the method.

The present invention addresses the needs by overcoming at least one drawback, disadvantage or limitation of the state of the art.

SUMMARY OF THE INVENTION

In accordance with a first aspect is disclosed method of determining efficacy of a cosmetic composition to inhibit an atmospheric pollutant from contacting skin, comprising the steps of:

(i) filling a sample holder of known dimensions with known amount of said composition to form a layer of defined thickness therein, where said sample holder is amenable to fluorescence-based assay;

(ii) depositing, on said layer, a known amount of a model fine particulate matter which resembles an atmospheric pollutant at least in size and which comprises a material responsive to fluorescence microscopy which is excitable by a wavelength ($\lambda_{ex}$) and which emits radiation ($\lambda_{em}$) where ($\lambda_{ex}$)≠($\lambda_{em}$);

(iii) irradiating said composition and said model fine particulate matter by said $\lambda_{ex}$ and recording intensity of fluorescence at $\lambda_{em}$ a plurality of times for a defined period during which said model fine particulate matter interacts with said layer; and, (iv) determining, corrected intensity of fluorescence at $\lambda_{em}$ by the following equation;

corrected intensity=recorded intensity/average transmittance where said average transmittance is the average of the transmittance of the composition measured at $\lambda_{ex}$ and $\lambda_{em}$ determined by Beer-Lambert law by measuring the absorbance at $\lambda_{ex}$ and $\lambda_{em}$, where the corrected intensity is inversely proportional to said efficacy of said composition.

DETAILED DESCRIPTION OF THE INVENTION

Figure 1:
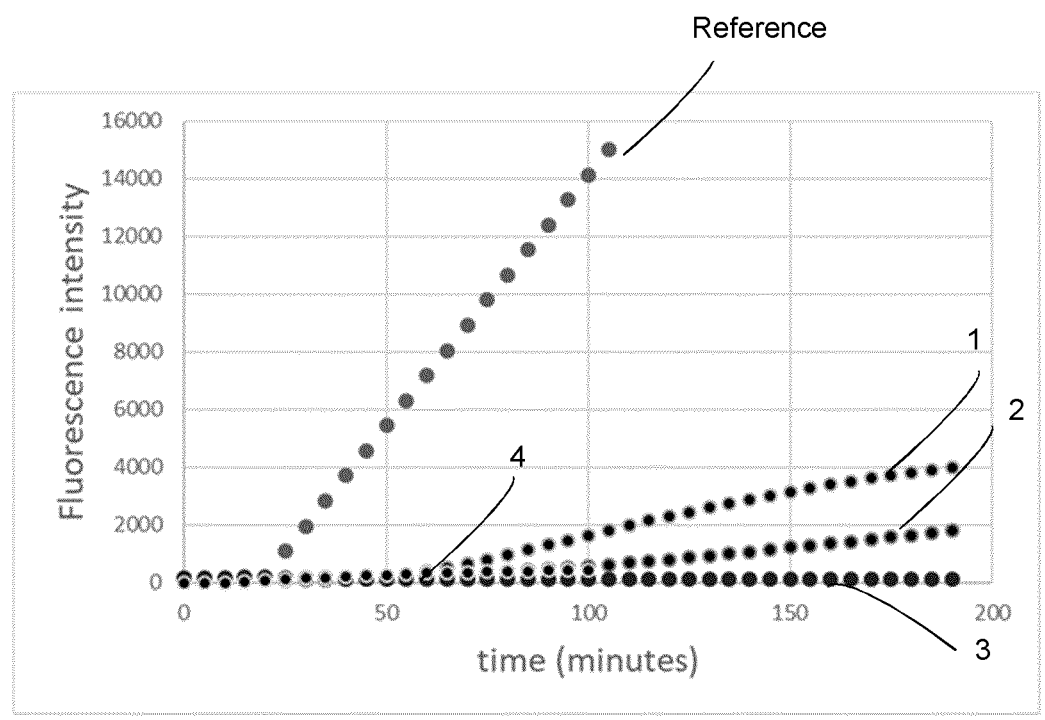
FIG. 1 is the graph "before calibration" and corresponds to the data contained in Table 3 of the Examples.

As used herein the term "comprising" encompasses the terms "consisting essentially of" and "consisting of". Where the term "comprising" is used, the listed steps or options need not be exhaustive. Unless otherwise specified, numerical ranges expressed in the format "from x to y" are understood to include x and y. In specifying any range of values or amounts, any particular upper value or amount can be associated with any particular lower value or amount. Except in the examples and comparative experiments, or where otherwise explicitly indicated, all numbers are to be understood as modified by the word "about". All percentages and ratios contained herein are calculated by weight unless otherwise indicated. As used herein, the indefinite article "a" or "an" and its corresponding definite article "the" means at least one, or one or more, unless specified otherwise. The various features of the present invention referred to in individual sections above apply, as appropriate, to other sections mutatis mutandis. Consequently, features specified in one section may be combined with features specified in other sections as appropriate. Any section headings are added for convenience only, and are not intended to limit the disclosure in any way. The examples are intended to illustrate the invention and are not intended to limit the invention to those examples per se.

The term cosmetic composition means any cosmetic composition. More particularly the cosmetic composition is a leave-on cosmetic. "Leave-on" as used herein means compositions that are applied to the skin and are not intended to be washed or rinsed off for some time, as contrasted with cleansing or wash-off or rinse-off compositions. Cosmetic composition means that cosmetic composition whose efficacy is to be determined by the method in accordance with the invention.

Preferably, when the cosmetic composition is a leave-on cosmetic composition, it is a serum, hand creams, face creams, body lotions, make up compositions such as foundations, lipsticks, hair styling gels, hair styling creams and deodorants and antiperspirants such as roll on or sticks. The compositions may accordingly be in a variety of formats as described hereinbefore.

The term in vitro means that the method in accordance with the invention is not carried out on human volunteers, for example, on forearms of human volunteers.

The term active ingredient means any ingredient, including film forming polymers included in the cosmetic composition to inhibit or prevent the contact of particulate pollutants with human skin. Non-limiting examples thereof include silicone polymers and extracts of natural products such as extract of roots or leaves of any plant.

Human skin acts like a natural shield which protects our body from external influences. However, at times, and under certain conditions, the skin may no longer perform this function fully and efficiently. There is plethora of evidence to substantiate that atmospheric pollutants affect the normal functioning of human skin. Particulate pollutants tend to top the list at least in some countries or some regions of the world.

Formulation scientists have explored and continue to explore newer and more effective cosmetic compositions to protect the skin from particulate pollutants, including the compositions or active agents which can resist, restrict or prevent the contact of such pollutants with skin. However, as discussed at length under the section of background and prior art, there is need for a more robust and reliable method for demonstrating the efficacy of such compositions. The present invention addresses such as need, at least in part.

The term particulate pollutant, also called particulate matter or PM, means a mixture of solids and liquid droplets floating in the air. Some particles are released directly from a specific source, while others form in complicated chemical reactions in the atmosphere. Suitable examples include dust, dirt, soot, or smoke. Particulate pollutants are described in terms of particle size: $PM_{2.5}$ and $PM_{10}$ having an aerodynamic diameter less than 2.5 µm and 10 µm, respectively. It is preferred that in the method in accordance with the invention, the model fine particulate matter resembles $PM_{2.5}$ or $PM_{10}$ at least in size.

In accordance with a first aspect is disclosed a method of determining efficacy of a cosmetic composition to inhibit an atmospheric pollutant from contacting skin. The method comprises, as first step, of filling a sample holder of known dimensions with known amount of said composition to form a layer of defined thickness therein, where said sample holder is amenable to fluorescence-based assay.

The method in accordance with the invention is carried out on in a sample holder. To perform the method, the sample holder is filled with known amount of the composition to form a layer of defined thickness therein. Preferably the amount is equivalent to the amount generally applied by the consumers under in use conditions. Usually cosmetic compositions comprise water, other volatile solvents or oils. Water and other volatile solvents evaporate upon application of the composition to the skin. On the other hand, where the compositions comprise oils, the oils tend to be absorbed by the skin. Eventually the composition dries up leaving behind a film or layer on the skin, which, depending on the amount applied or the recommended amount for application, could range from a few microns to few thousand microns. Therefore, preferably the known amount of the composition is that amount which is sufficient to form, upon drying for 12 hours, a layer of 10 to 1000 µm in the sample holder. Further preferably the known amount of said composition is from 10 to 100 µL.

It is preferred that the material of construction of the sample holder is non-interfering with the fluorescence-based assay. This might become necessary to ensure that the data and thereby the inference drawn from it, is not erroneous. Preferably the length of the sample holder is 0.5 to 2 cm. Further preferably the sample-holder is a cuvette or a microplate having plurality of sample wells arranged in a matrix where each well serves as a sample holder. It is preferred that the material of construction of the sample holder is a polymer, more preferably polystyrene.

The next step involves depositing, on the layer, a known amount of a model fine particulate matter which resembles an atmospheric pollutant at least in size and which comprises a material responsive to fluorescence microscopy which is excitable by a wavelength ($\lambda_{ex}$) and which emits radiation ($\lambda_{em}$) where ($\lambda_{ex}$)≠($\lambda_{em}$).

As disclosed in the website, https://www.microscopyu.com/techniques/fluorescence/introduction-to-fluorescence-microscopy, the basic function of a fluorescence microscope is to irradiate the specimen with a desired and specific band of wavelengths, and then separate the much weaker emitted fluorescence from the excitation light. In a properly configured microscope, only the emission light should reach the eye or detector so that the resulting fluorescent structures are superimposed with high contrast against a very dark (or black) background. The limits of detection are generally governed by the darkness of the background, and the excitation light is typically several hundred thousand to a million times brighter than the emitted fluorescence.

And further, as disclosed in the website, https://www.olympus-lifescience.com/en/microscope-resource/primer/lightandcolor/fluoroexcitationl, in order to determine the emission spectrum of a particular fluorochrome, the wavelength of maximum absorption (usually the same as the excitation maximum) is determined and the fluorochrome is excited at that wavelength. The absorption spectrum of a typical fluorochrome is where the relative intensity of absorption is plotted against the measured wavelength. A monochromator (a device that allows narrow bands of light wavelengths to pass) is then used to scan the fluorescence emission intensity over the entire series of emission wavelengths. The relative intensity of the fluorescence is measured at the various wavelengths to plot the emission spectrum. The excitation spectrum of a given fluorochrome is determined in a similar manner by monitoring fluorescence emission at the wavelength of maximum intensity while the fluorophore is excited through a group of consecutive wavelengths. The emission maximum is chosen and only emission light at that wavelength is allowed to pass to the detector. Excitation is induced (usually by means of a monochromator) at various excitation wavelengths and the intensity of the emitted fluorescence is measured as a function of wavelength. The result is a graph or curve which depicts the relative fluorescence intensity produced by excitation over the spectrum of excitation wavelengths.

It is preferred that the model fine particulate matter comprises a synthetic polymeric material, a natural polymeric material, a water-insoluble salt, a mineral, a metal, an alloy, glass or a mixture thereof. Further preferably the synthetic polymeric material is a polyamide, polyacetate, polyester, polyacrylate, polystyrene, polyethylene, polypropylene, rayon, polyvinyl chloride or a mixture thereof. Further preferably the natural polymeric material is cellulose, regenerated cellulose, starch, microcrystalline cellulose or a mixture thereof. It is particularly preferred that the model fine particulate matter is in the form of beads comprising polystyrene and a fluorescent material, said microscopic imaging technique is fluorescence microscopy. In such a case it is preferred that the diameter of the model fine particulate matter is 200 to 800 nm. This enables easy experimentation. Further preferably the fluorescent material absorbs and emits radiation of wavelength 400 to 800 nm, more preferably 400 to 600 nm. In such a case it is preferred that the intensity of fluorescence of emitted radiation is measured in-line with the excitation radiation.

The next step involves irradiating the sample and the model fine particulate matter by the $\lambda_{ex}$ and recording intensity of fluorescence at $\lambda_{em}$ a plurality of times for a defined period during which said model fine particulate matter interacts with said layer.

A plurality of times includes measurements at least more than once.

It is preferred that the known amount of the composition is that amount which is sufficient to form, upon drying for 12 hours, a layer of 10 to 1000 μm in the sample holder. The known amount of the composition, preferably, is from 10 to 100 μL.

To simulate actual real-life situation to the extent possible, the amount of the model particulate matter should be enough to simulate such conditions. Therefore, it is preferred that 1 to 10 μL of said model fine particulate matter is deposited on the layer. The diameter of the droplet suspension should be smaller than the length of the sample holder which contains cosmetic compositions to prevent the suspension from leaking at the edges, where the composition is likely to detach from the sample holder.

The concentration of the particulate matter is from 0.03% to 2.6%, preferably from 0.05-0.5%.

In accordance with the present invention, it is particularly preferred that the model fine particulate matter is in the form of beads comprising polystyrene and a fluorescent material, said microscopic imaging technique is fluorescence microscopy and said human skin-equivalent is artificial skin. A particularly preferred material is Fluorescent Probes, which are Polystyrene-based particles (1 μm diameter) with fluorescent tagging Ex. Polysciences Inc.

Plate readers, also known as microplate readers or microplate photometers, are instruments which are used to detect biological, chemical or physical events of samples in microtiter plates. They are widely used in research, drug discovery, bioassay validation, quality control and manufacturing processes in the pharmaceutical and biotechnological industry and academic organizations. Sample reactions can be assayed in 6 to 1536 well format microtiter plates. The most common microplate format used in academic research laboratories or clinical diagnostic laboratories is 96-well (8 by 12 matrix) with a typical reaction volume between 100 and 200 μL per well. Higher density microplates (384- or 1536-well microplates) are typically used for screening applications, when throughput (number of samples per day processed) and assay cost per sample become critical parameters, with a typical assay volume between 5 and 50 μL per well. Common detection modes for microplate assays are absorbance, fluorescence intensity, luminescence, time-resolved fluorescence, and fluorescence polarization.

Fluorescence detection technique has been used widely along with microplate readers. In this type of instrumentation, a first optical system (excitation system) illuminates the sample using a specific wavelength (selected by an optical filter, or a monochromator). As a result of the illumination, the sample emits light (it fluoresces) and a second optical system (emission system) collects the emitted light, separates it from the excitation light (using a filter or monochromator system), and measures the signal using a light detector such as a photomultiplier tube (PMT).

It is particularly preferred that the defined period is from 1 to 3000 minutes. In such a case, slope (k) of a plot of intensity against time in the range of a linear increase is indicative of short-term efficacy of said candidate cosmetic composition and the nature of the plot reaching a plateau is indicative of its longer-term efficacy.

It is necessary to be able to determine as accurately as possible, the dynamics of penetration (speed) of a model pollutant from the atmosphere over a period so that is thereby possible to determine the short-term efficacy and the longer-term efficacy of cosmetic compositions that claim to prevent, or at least delay the contact of particulate atmospheric pollutants with human skin by forming to the extent possible, a barrier between the skin and the pollutant. Usually, after elapse of time upon application of a leave-on cosmetic composition to the skin, the composition forms a layer on the skin, which performs the intended function. When such a cosmetic is intended to act as a barrier against environmental pollutants such as $PM_{2.5}$, in the initial stage the layer prevents or resists the contact of the pollutant with the skin. However, over a period, the pollutant may enter the bulk of the layer and then move towards the skin. The layer will resist this movement, to the extent it can, depending on the nature of the composition and the efficacy of active ingredient therein, if any, such as film forming polymers. Eventually the pollutant may even pass through the layer and establish contact with the skin.

To be able to get the data pertaining to longer and shorter-term efficacy, the data is collected at intervals of every 2 to 10 minutes starting from T=0. In such a case, the slope (k) of the linear fit of the data between $T_{start}$ and $T_{end}$, indicates the penetration speed of said model fine particulate matter into said layer, where $T_{start}$ is the time when fluorescence intensity begins to increase, and $T_{end}$ is the time when fluorescence intensity reaches plateau. Using this information, it becomes possible to easily and correctly distinguish between an efficacious composition from a non-efficacious composition or even a less efficacious composition from a more efficacious or potent composition.

However, as disclosed earlier, the intensity of fluorescence is prone to be affected by a number of cosmetic ingredients that are often present in cosmetic compositions and a non-exhaustive list would include organic sunscreens, film-forming polymers, coloured ingredients such as pigments and oily ingredients such as fatty acids or fatty alcohols. Any method should permit objective analysis whilst accounting for or taking care of erroneous observations that may result due to presence of ingredients that tend to interfere in the analysis or tend to produce false positive results.

Accordingly, the present inventors have found that corrected intensity of fluorescence at $\lambda_{em}$ can be found out by the following equation.

corrected intensity=recorded intensity/average transmittance

The term average transmittance means the average of the transmittance of the composition measured at $\lambda_{ex}$ and $\lambda_{em}$ determined by Beer-Lambert law.

Corrected intensity is a better and technically more robust indicator of the efficacy of the composition, as compared to the recorded intensity of fluorescence because interference of the ingredients that could possibly distort the observations or data gets minimized to the extent possible.

The corrected intensity is inversely proportional to the efficacy of said composition, i.e. if the composition is efficacious enough then the movement or gradual progression of the model fine particulate matter which has been deposited on the layer would be minimal because the layer would act as an efficient barrier against the entry of the particulate matter. In such a case, the source of the emitted radiation (i.e., the model fine particulate matter) would be farther away from the detector. Therefore, the recorded intensity would be weaker. On the other hand, if the composition is not efficacious enough then the movement or gradual progression of the model fine particulate matter which has been deposited on the layer would be not be restricted to that extent because the layer of the composition would not act as an efficient barrier against the entry of the model fine particulate matter. In such a case, the source of the emitted radiation (i.e., the model fine particulate matter) would be closer to the detector. Therefore, the recorded intensity would comparatively be more intense.

Preferably the steps (i) to (iv) are also performed with a reference cosmetic composition, where said efficacy of said composition is the difference between efficacy of the cosmetic composition and the reference cosmetic composition. The term reference cosmetic composition means a composition which contains minimum ingredients and especially devoid of the ingredient if interest, for example, a film-forming polymer.

Figure 3:
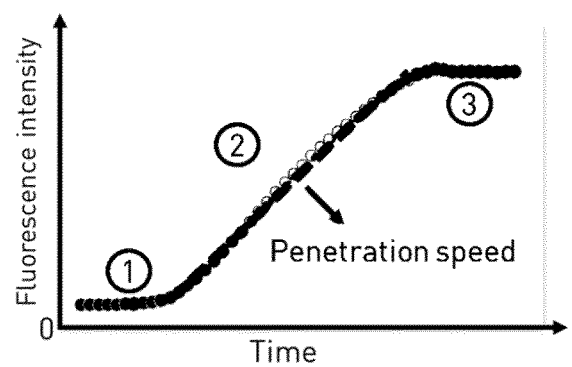
FIG. 3 illustrates a typical time-profile of the intensity of fluorescence.

A typical time-profile of the intensity of fluorescence is shown in FIG. 3.

Stage 1 is considered as when cream surface and model pollutants gradually interact with each other. Then it comes to stage 2, when model pollutants begin to penetrate or enter the layer of the cream. With more model particles entering the layer, they get closer and closer to the fluorescence detector below, and thereby the overall intensity of fluorescence begins to increase. Finally, the penetration process reaches an equilibrium, and the intensity of fluorescence reaches a plateau. This process, stage 3, is considered as the longer-term efficacy of the cosmetic composition. Stage 2 is used to indicate the efficacy of the composition.

At stage 2, the intensity increases in a linear manner. Thus, a linear fit is used to fit this stage well enough. A higher/greater slope is equated to faster penetration, and serves as an indication of the film being a not so good barrier. A simplified formulation containing minimum ingredients is used as reference. This reference formulation is considered to provide the least barrier. The efficacy of blocking is calculated as follows:

Block efficacy=1$-k_{cosmetic\ composition}/k_{reference\ cosmetic\ composition}$ The method of the invention is useful to determine either the efficacy of a cosmetic composition as a whole, or of one or more active ingredients in the composition. Preferably the ingredient is a film forming polymer, for example, a silicone resin.

The method in accordance with this invention is preferably used to distinguish between efficacy of a first composition from a second composition or alternatively could be useful to distinguish between the efficacy of two or more ingredients, to choose one over the other. In this case, the steps (i) to (iv) are first carried out on a first composition or a first ingredient, as the case may be, and then repeated on a second composition to thereby compare the efficacy.

The demonstration may be useful for any consumer promotion event, or a consumer demonstration such as in a mall or supermarket or a consumer fair. The demonstration may also be useful for claim support and advertising.

The Cosmetic Composition

The concerned composition can be applied directly to the skin. Alternatively, it can be delivered by various transdermal delivery systems, such as transdermal patches as known in the art. For example, for topical administration, the active ingredient can be formulated in a solution, gel, lotion, ointment, cream, suspension, paste, liniment, powder, tincture, aerosol, patch, or the like in a cosmetically acceptable form by methods known in the art. The composition can be any of a variety of forms common in the cosmetic arts for topical application to humans.

The compositions may be made into a wide variety of product types that include but are not limited to solutions, suspensions, lotions, creams, gels, toners, sticks, sprays, ointments, pastes, foams, powders, mousses, strips, patches, electrically-powered patches, hydrogels, film-forming products, facial and skin masks, make-up such as foundations and the like. These product types may contain several types of cosmetically-acceptable carriers including, but not limited to solutions, suspensions, emulsions such as microemulsions and nanoemulsions, gels, solids and liposomes.

The composition can be formulated as a solution which includes an aqueous or organic solvent, e.g., 50 to 90 wt % of a cosmetically acceptable aqueous or organic solvent. Examples of suitable organic solvents include: propylene glycol, polyethylene glycol, polypropylene glycol, glycerol, 1,2,4-butanetriol and sorbitol esters.

A lotion can be made from such a solution. Lotions typically contain from about 1% to about 20 wt % emollient(s) and from 50 to 90 wt % water.

Another type of product that may be formulated from a solution is a cream. A cream typically contains 5 to 50 wt % emollient(s) and 45 to 85 wt % water.

The composition described herein can also be formulated as emulsion. If the carrier is an emulsion, then 1 to 10 wt % of the carrier contains an emulsifier(s). Emulsifiers may be nonionic, anionic or cationic.

Single emulsion skin care preparations, such as lotions and creams, of the oil-in-water type and water-in-oil type are well-known in the art and are useful in compositions and methods described herein. Multiphase emulsion compositions, such as the water-in-oil-in-water type or the oil-in-water-in-oil type, are also useful in the compositions and methods describe herein. In general, such single or multiphase emulsions contain water, emollients, and emulsifiers as essential ingredients.

The compositions described herein can also be formulated as a gel (e.g., an aqueous, alcohol, alcohol/water, or oil gel using a suitable gelling agent(s)). Suitable gelling agents for aqueous and/or alcoholic gels include, but are not limited to, natural gums, acrylic acid and acrylate polymers and copolymers, and cellulose derivatives (e.g., hydroxymethyl cellulose and hydroxypropyl cellulose). Suitable gelling agents for oils (such as mineral oil) include, but are not limited to, hydrogenated butylene/ethylene/styrene copolymer and hydrogenated ethylene/propylene/styrene copolymer. Such gels typically contain 0.1 to 5 wt % gelling agents.

Other suitable solid/liquid agents may include vitamins and their derivatives. Compositions of the present invention may include vitamins as the desired active. Illustrative vitamins are vitamin A (retinol) as well as retinol esters like retinol palmitate and retinol propionate, vitamin B2, vitamin B3 (niacinamide), vitamin B6, vitamin C, vitamin D, vitamin E, folic acid and biotin. Derivatives of the vitamins may also be employed. For instance, vitamin C derivatives include ascorbyl tetraisopalmitate, magnesium ascorbyl phosphate and ascorbyl glycoside. Derivatives of vitamin E include tocopheryl acetate, tocotrienol, tocopheryl palmitate and tocopheryl linoleate. DL-panthenol and derivatives may also be employed. Total amount of vitamins when present in the compositions may range from 0.001 to 10%.

Sunscreen agents may also be included in compositions as solid/liquid agents. Particularly preferred are such materials as phenylbenzimidazole sulfonic acid (Ensulizole), ethylhexyl salicylate (octyl salicylate), ethylhexyl p-methoxycinnamate, available as Parsol MCX®, Avobenzene, available as Parsol 1789®. and benzophenone-3, also known as Oxybenzone®. Octocrylene is also suitable for use. Amounts of the sunscreen agents when present may generally range from 0.1 to 30 wt %.

Suitable oils include esters, triglycerides, hydrocarbons and silicones. These can be a single material or a mixture of one or more materials. They may normally comprise 0.5 to 90 wt %.

Examples of surface active agents which may be used in the compositions described herein include sodium alkyl sulfates, e.g., sodium lauryl sulfate and sodium myristyl sulfate, sodium N-acyl sarcosinates, e.g., sodium N-lauroyl sarcosinate and sodium N-myristoyl sarcosinate, sodium dodecylbenzenesulfonate, sodium hydrogenated coconut fatty acid monoglyceride sulfate, sodium lauryl sulfoacetate and N-acyl glutamates, e.g., N-palmitoyl glutamate, N-methylacyltaurin sodium salt, N-methylacylalanine sodium salt, sodium alpha-olefin sulfonate and sodium dioctylsulfosuccinate; N-alkylaminoglycerols, e.g., N-lauryl-diamino-ethylglycerol and N-myristyldiaminoethylglycerol, N-alkyl-N-carboxymethylammonium betaine and sodium 2-alkyl-1-hydroxyethylimidazoline betaine; polyoxyethyleneaalkyl ether, polyoxyethylenealkylaryl ether, polyoxyethylenelanolin alcohol, polyoxyethyleneglyceryl monoaliphatic acid ester, polyoxyethylenesorbitol aliphatic acid ester, polyoxyethylene aliphatic acid ester, higher aliphatic acid glycerol ester, sorbitan aliphatic acid ester, Pluronic type surface active agent, and polyoxyethylenesorbitan aliphatic acid esters such as polyoxyethylenesorbitan monooleate and polyoxyethylenesorbitan monolaurate. Emulsifier-type surfactants known to those of skill in the art can be used in the compositions described herein.

The surfactants can be used at levels from 4 to 90% depending on the type of the composition.

In addition, the composition may include therapeutic agents, carriers, adjuvants, and the like. Some particular additional agents may include retinoids; antioxidants; hydroxy acids; fatty acids, acceptable non-toxic metal salts of naturally occurring amino acids or of hydroxyalkyl acids; botanical extracts, salicylic acid, keratolytic agents, complexing agents, colorants and fragrance ingredients.

The invention will now be described in detail with the following non-limiting examples.

EXAMPLES

Example 1

The method of the invention was carried out on four different cosmetic leave-on compositions. A simplified cosmetic composition was prepared for use as the reference.

The formulations of the compositions, as disclosed on the back-of-pack, were as follows:

TABLE 1

| | Composition Name | | | | |
|---|---|---|---|---|---|
| | Reference | 1 | 2 | 3 | 4 |
| | Water | Water | Water | Water | Water |
| | Caprylic/Capric Triglycerides | Ethyl hexyl salicylate | Glycerin | Stearic acid | Dimethicone |
| | PEG-100 Stearate | Glycerin | Sodium Hydroxide | Niacinamide | Glycerine |
| | Ammonium Acryloyldimethyl-taurate/VP Copolymer | Stearic acid | Sodium pyrrolidone carbonic acid | Isopropyl Myristate | Zea mays starch/corn starch |

TABLE 1-continued

| | Composition Name | | | |
|---|---|---|---|---|
| Reference | 1 | 2 | 3 | 4 |
| D5 | Phenylbenz-imidazole sulfonic acid | Glutamic acid | Glyceryl stearate | Isohexadecane |
| Glydant Plus Liquid | Glycol stearate and stearamide AMP | Methyl paraben | Mineral oil | Sorbitan stearate |
| Disodium EDTA | PEG-100 stearate | Allantoin | Ethylhexyl methoxy-cinnamate | Pentylene glycol |
| | Butyl methoxy dibenzoyl-methane | Disodium EDTA | Glycerine | Ammonium polyacryloyl-dimethyl taurate |
| | dimethicone | Stearic Acid | Triethanolamine | Betula alba juice |
| | octocrylene phenoxyethanol | cetyl alcohol Propylparaben | Cetyl alcohol Dimethicone | BHT Butylene glycol |
| | Glyceryl stearate | Isopropyl myristate | carbomer | Butyro-spermum parkii seedcake extract |
| | Potassium hydroxide | Ethyl hexyl Methoxy cinnamate | Butyl methoxy dibenzoyl-methane | C13-14 isoparaffin |
| | Caprylyl glycol | Mineral Oil | Methylparaben | Caprylyl glycol |
| | Carbomer | Glyceryl stearate | Sodium PCA | Citric acid |
| | Cetyl alcohol | Butyl Methoxy dibenzoyl-methane | Glutamic acid | Disodium EDTA |
| | Petrolatum | Dimethicone | Titanium dioxide | Laureth-7 mannose |
| | Niacinamide | Titanium dioxide | Hydroxy stearic acid | Mentha piperita extract |
| | Xanthum Gum | carbomer | Propyl paraben | Poloxamer 338 |
| | Sodium Hydroxide | Triethanol-amine | allantoin | Polyacrylamide |
| | Disodium EDTA | Niacinamide | Sodium hydroxide | Potassium sorbate |
| | BHT | Sodium ascorbyl phosphate | Tocopheryl acetate | Sodium benzoate |
| | Tocopheryl acetate | Tocopheryl acetate | Disodium EDTA | Stearyl alcohol |
| | Sodium ascorbyl phosphate | Phenoxy-ethanol | Sodium ascorbyl phosphate | Sucrose cocoate |
| | Perfume | Terpineol | Citronellol | t-butyl alcohol Tocopherol |
| | Benzyl salicylate | Thymol | | |
| | Butylphenyl methyl propional | Fragrance | | Ginger root extract |
| | Citronellol | | | |
| | Hexyl cinnamal | | | |
| | Limonene | | | |
| | Linalool | | | |

Fluoresbrite® YG carboxylate microspheres (2.5% aqueous suspension), from Polysciences, were used as model PM 2.5, which are carboxy-modified monodispersed polystyrene particles with nominal diameters of 0.5 μm. Their $\lambda_{ex}$ was 441 nm and $\lambda_{ex}$ was 486 nm.

The measurement chambers were adapted from Corning Costar® 48 well clear TC-Treated Multiple Well Plates (product #3548). The plates were made by polystyrene material with flat bottom, the growth area for each well is 0.95 cm². During the sample preparation step, 80 μL of sample skin product cream was injected by multi-channel pipette into each well, centrifugation (3000 RPM, 5 minutes) on the horizontal plane was applied to smooth the cream surface and get rid of the air. The samples were placed in a fume hood for eight hours at room temperature. Before measurement, one droplet of model pollutant suspension (3 µL) was added via pipette on top of the layer at time T=0.

The measurement lasted for about 3 hours. The sample cream products in all 24 wells could be measured simultaneously, and the total fluorescence of each well was recorded as a function of time for every five minutes.

As the model pollutant penetrated through sample cream layer, the total fluorescence intensity increased as a function of time. A linear fit was used to describe the increase of the time-dependent fluorescence intensity. The slope from linear fit was used to indicate the speed of penetration of the model pollutant through the layer. The efficacy of the cosmetic composition to inhibit the atmospheric pollutant (in this experiment, the model) from contacting skin is directly proportional to the slope.

The absorbance and transmittance values are tabulated in Table 2.

TABLE 2

| Composition | Absorbance at nm 484 | Absorbance at nm 441 | Transmittance at nm 484 | Transmittance at nm 441 | T-avg | 1/T-avg | scaled (1/Tavg) |
|---|---|---|---|---|---|---|---|
| Reference | 1.0446 | 1.0950 | 0.0902 | 0.0803 | 0.0851 | 11.7442 | 1.00 |
| 1 | 1.7577 | 1.8659 | 0.0175 | 0.0136 | 0.0154 | 64.8317 | 5.52 |
| 2 | 1.8525 | 1.9763 | 0.0140 | 0.0106 | 0.0122 | 82.1084 | 6.99 |
| 3 | 1.9595 | 2.0902 | 0.0110 | 0.0081 | 0.0094 | 105.8797 | 9.02 |
| 4 | 1.5171 | 1.4828 | 0.0304 | 0.0329 | 0.0316 | 31.6202 | 1.42 |

The observations of fluorescence intensity (before calibration) are tabulated in Table 3 and after calibration are tabulated in Table 4.

TABLE 3

| Time/ minutes | Fluorescence intensity at $\lambda_{em}$ Reference | 1 | 2 | 3 | 4 |
|---|---|---|---|---|---|
| 0 | 63 | 55 | 128 | 149.5 | 1.48 |
| 5 | 68.5 | 49.5 | 102 | 150.5 | 1.48 |
| 10 | 86.25 | 51.5 | 97 | 151.5 | 1.58 |
| 15 | 213.5 | 52 | 94.5 | 152.5 | 42.58 |
| 20 | 213.5 | 53.5 | 97 | 150 | 77.91 |
| 25 | 1083.4 | 57 | 102.5 | 148.5 | 111.91 |
| 30 | 1953.3 | 62 | 110 | 146.5 | 148.58 |
| 35 | 2823.2 | 72 | 119 | 141 | 178.58 |
| 40 | 3693.1 | 92 | 133 | 127 | 210.91 |
| 45 | 4563 | 128.5 | 153.5 | 105.5 | 238.58 |
| 50 | 5432.9 | 185.5 | 179 | 107.5 | 266.58 |
| 55 | 6302.8 | 266.5 | 207 | 108.5 | 293.25 |
| 60 | 7172.7 | 370.5 | 235.5 | 108.5 | 316.25 |
| 65 | 8042.6 | 494.5 | 266.5 | 109 | 334.25 |
| 70 | 8912.5 | 637 | 301 | 108 | 353.58 |
| 75 | 9782.4 | 791.5 | 340.5 | 108.5 | 378.91 |
| 80 | 10652.3 | 953.5 | 382 | 110 | 390.25 |
| 85 | 11522.2 | 1121.5 | 425 | 110 | 401.91 |
| 90 | 12392.1 | 1295 | 469 | 110 | 413.25 |
| 95 | 13262 | 1468 | 518 | 110.5 | 425.58 |
| 100 | 14131.9 | 1636 | 566 | 111.5 | 437.25 |
| 105 | 15001.8 | 1810.5 | 621 | 113 | |
| 110 | | 1974.5 | 675 | 114.5 | |
| 115 | | 2140.5 | 734 | 114 | |
| 120 | | 2295.5 | 798 | 116 | |
| 125 | | 2441 | 863 | 117 | |
| 130 | | 2602 | 929 | 118 | |
| 135 | | 2749.5 | 996 | 119 | |
| 140 | | 2886.5 | 1067 | 120 | |
| 145 | | 3016.5 | 1133.5 | 122 | |
| 150 | | 3136 | 1205 | 122.5 | |

TABLE 3-continued

| Time/ minutes | Fluorescence intensity at $\lambda_{em}$ Reference | 1 | 2 | 3 | 4 |
|---|---|---|---|---|---|
| 155 | | 3261.5 | 1273.5 | 123.5 | |
| 160 | | 3382 | 1351 | 125.5 | |
| 165 | | 3503.5 | 1420.5 | 127 | |
| 170 | | 3613 | 1497 | 128 | |
| 175 | | 3715.5 | 1565.5 | 129.5 | |
| 180 | | 3797 | 1640 | 131.5 | |
| 185 | | 3876 | 1711 | 132.5 | |
| 190 | | 3979.5 | 1782 | 134.5 | |

TABLE 4

(After calibration)

| Time/ minutes | Fluorescence intensity at $\lambda_{em}$ Reference | 1 | 2 | 3 | 4 |
|---|---|---|---|---|---|
| 0 | 63 | 303.6 | 894.72 | 1348.49 | 4 |
| 5 | 68.5 | 273.24 | 712.98 | 1357.51 | 4 |
| 10 | 86.25 | 284.28 | 678.03 | 1366.53 | 4.26 |
| 15 | 213.5 | 287.04 | 660.555 | 1375.55 | 114.55 |
| 20 | 213.5 | 295.32 | 678.03 | 1353 | 209.60 |
| 25 | 1083.4 | 314.64 | 716.475 | 1339.47 | 301.06 |
| 30 | 1953.3 | 342.24 | 768.9 | 1321.43 | 399.69 |
| 35 | 2823.2 | 397.44 | 831.81 | 1271.82 | 480.39 |
| 40 | 3693.1 | 507.84 | 929.67 | 1145.54 | 567.37 |
| 45 | 4563 | 709.32 | 1072.965 | 951.61 | 641.79 |
| 50 | 5432.9 | 1023.96 | 1251.21 | 969.65 | 717.11 |
| 55 | 6302.8 | 1471.08 | 1446.93 | 978.67 | 788.85 |
| 60 | 7172.7 | 2045.16 | 1646.145 | 978.67 | 850.72 |
| 65 | 8042.6 | 2729.64 | 1862.835 | 983.18 | 899.14 |
| 70 | 8912.5 | 3516.24 | 2103.99 | 974.16 | 951.14 |
| 75 | 9782.4 | 4369.08 | 2380.095 | 978.67 | 1019.29 |
| 80 | 10652.3 | 5263.32 | 2670.18 | 992.2 | 1049.78 |
| 85 | 11522.2 | 6190.68 | 2970.75 | 992.2 | 1081.16 |
| 90 | 12392.1 | 7148.4 | 3278.31 | 992.2 | 1111.65 |
| 95 | 13262 | 8103.36 | 3620.82 | 996.71 | 1144.82 |
| 100 | 14131.9 | 9030.72 | 3956.34 | 1005.73 | 1176.21 |
| 105 | 15001.8 | 9993.96 | 4340.79 | 1019.26 | |
| 110 | | 10899.24 | 4718.25 | 1032.79 | |
| 115 | | 11815.56 | 5130.66 | 1028.28 | |
| 120 | | 12671.16 | 5578.02 | 1046.32 | |
| 125 | | 13474.32 | 6032.37 | 1055.34 | |
| 130 | | 14363.04 | 6493.71 | 1064.36 | |
| 135 | | 15177.24 | 6962.04 | 1073.38 | |
| 140 | | 15933.48 | 7458.33 | 1082.4 | |
| 145 | | 16651.08 | 7923.165 | 1100.44 | |
| 150 | | 17310.72 | 8422.95 | 1104.95 | |
| 155 | | 18003.48 | 8901.765 | 1113.97 | |
| 160 | | 18668.64 | 9443.49 | 1132.01 | |
| 165 | | 19339.32 | 9929.295 | 1145.54 | |
| 170 | | 19943.76 | 10464.03 | 1154.56 | |

TABLE 4-continued (After calibration)

| Time/ minutes | Fluorescence intensity at $\lambda_{em}$ | | | |
|---|---|---|---|---|
| | Reference | 1 | 2 | 3 | 4 |
| 175 | | 20509.56 | 10942.85 | 1168.09 | |
| 180 | | 20959.44 | 11463.6 | 1186.13 | |
| 185 | | 21395.52 | 11959.89 | 1195.15 | |
| 190 | | 21966.84 | 12456.18 | 1213.19 | |

Figure 2:
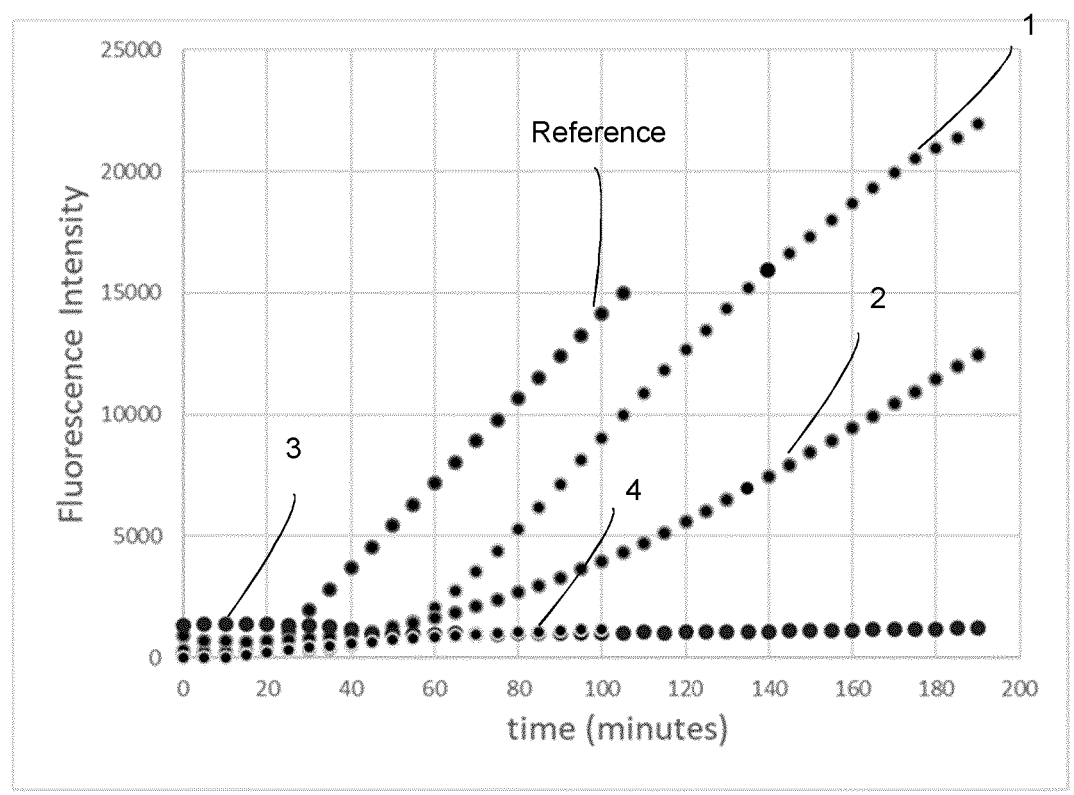
FIG. 2 is the graph "after calibration" and corresponds to the data contained in Table 4.

The data and observations contained in Tables 3 and 4 are graphically represented in FIGS. 1 and 2 respectively. FIG. 1 is the graph before calibration and corresponds to the data contained in Table 3. FIG. 2 is the graph after calibration and corresponds to the data contained in Table 4.

The graphs clearly indicate that before calibration the difference between the effects of the compositions 1, 2, 3 and 4 is not as clearly noticeable as the representation in FIG. 2. Further, according to FIG. 1, it appears as if the efficacy of composition 1 is better than the reference cosmetic composition. However, this not the reality because after calibration, the block efficacy of the cosmetic composition 1 is almost the same as that of the Reference cosmetic composition.

The [calculated] data pertaining to the block efficacy is summarised in Table 5.

TABLE 5

| Details of the composition | Slope | Block efficacy |
|---|---|---|
| Reference Composition | 171.2 | 0 |
| Composition 1 | 159.5 | 6.8% |
| Composition 2 | 82.5 | 51.8% |
| Composition 3 | 2.2 | 98.7% |
| Composition 4 | 12.5 | 92.7% |

The data in Table 5 clearly indicates how the test cosmetic compositions perform as compared to the reference cosmetic composition.

The invention claimed is:

1. A method of determining efficacy of a cosmetic composition to inhibit an atmospheric pollutant from contacting skin, comprising the steps of:
  (i) filling a sample holder of known dimensions with known amount of said composition to form a layer of defined thickness therein, where said sample holder is amenable to fluorescence-based assay;
  (ii) depositing, on said layer, a known amount of a model fine particulate matter which resembles an atmospheric pollutant at least in size and which comprises a material responsive to fluorescence microscopy which is excitable by a wavelength ($\lambda_{ex}$) and which emits radiation ($\lambda_{em}$) where ($\lambda_{ex}$)≠($\lambda_{em}$);
  (iii) irradiating said composition and said model fine particulate matter by said $A_{ex}$ and recording intensity of fluorescence at $\lambda_{em}$ a plurality of times for a defined period during which said model fine particulate matter interacts with said layer; and,
  (iv) determining, corrected intensity of fluorescence at $\lambda_{em}$ by the following equation:

corrected Intensity=recorded intensity/average transmittance where said average transmittance is the average of the transmittance of the composition measured at $\lambda_{ex}$ and $\lambda_{em}$ determined by Beer-Lambert law by measuring the absorbance at $\lambda_{ex}$ and $\lambda_{em}$, where the corrected intensity is inversely proportional to said efficacy of said composition.

2. The method as claimed in claim 1, wherein said steps are also performed with a reference cosmetic composition, where said efficacy of said composition is the difference between efficacy of said cosmetic composition and said reference cosmetic composition.

3. The method as claimed in claim 1, wherein said model fine particulate matter resembles $PM_{2.5}$ or $PM_{10}$ at least in size.

4. The method as claimed in claim 1, wherein said fluorescence-based assay is fluorescence microscopy or fluorescence spectroscopy.

5. The method as claimed in claim 1, wherein said defined period is from 1 to 3000 minutes.

6. The method as claimed in claim 1, wherein slope (k) of a plot of intensity against time in the range of a linear increase is indicative of short-term efficacy of said candidate cosmetic composition and the nature of the plot reaching a plateau is indicative of its longer-term efficacy.

7. The method as claimed in claim 6, wherein data is collected at intervals of every 2 to 10 minutes starting from T=0.

8. The method as claimed in claim 6, wherein slope (k) of the linear fit of the data between $T_{start}$ and $T_{end}$, indicates the penetration speed of said model fine particulate matter into said layer, where $T_{start}$ is the time when fluorescence intensity begins to increase, and $T_{end}$ is the time when fluorescence intensity reaches plateau.

9. The method as claimed in claim 6, wherein from the slope (k) an extent of block efficacy is calculated using the formula:

Block efficacy=1−$k_{cosmetic\ composition}$/$k_{reference\ cosmetic\ composition}$, where said block efficacy is indicative of how better the cosmetic composition is as compared to the reference cosmetic composition.

10. The method as claimed in claim 1, wherein said model fine particulate matter comprises a synthetic polymeric material, a natural polymeric material, a water-insoluble salt, a mineral, a metal, an alloy, glass or a mixture thereof.

11. The method as claimed in claim 10, wherein said model fine particulate matter is in the form of beads comprising polystyrene and a fluorescent material.

12. The method as claimed in claim 1, wherein said known amount of said composition is that amount which is sufficient to form, upon drying for 12 hours, a layer of 10 to 1000 μm in the sample holder.

13. The method as claimed in claim 1, wherein said sample holder is a cuvette or a microplate having plurality of sample wells arranged in a matrix where each well serves as a sample holder.

14. The method as claimed in claim 1, wherein said sample holder has a length of 0.5 to 2 cm.

15. The method as claimed in claim 11, wherein said fluorescent material absorbs and emits radiation of wavelength 400 to 800 nm.

* * * * *